United States Patent [19]
Bishop et al.

[11] Patent Number: 5,584,255
[45] Date of Patent: Dec. 17, 1996

[54] METHOD AND APPARATUS FOR GASIFYING ORGANIC MATERIALS AND VITRIFYING RESIDUAL ASH

[75] Inventors: Norman G. Bishop, Houston, Tex.; D. Gene Taylor, Irvine, Calif.

[73] Assignees: Proler Environmental Services, Inc., Houston, Tex.; Hylsa S.A. de C.V., San Nicolas, Mexico

[21] Appl. No.: 473,271

[22] Filed: Jun. 7, 1995

[51] Int. Cl.⁶ .................................................... F23G 5/00
[52] U.S. Cl. .................. 110/235; 110/259; 110/346; 48/197 R
[58] Field of Search .................................. 110/346, 235, 110/259; 48/197 R

[56] References Cited

U.S. PATENT DOCUMENTS

| | | | |
|---|---|---|---|
| 4,544,394 | 10/1985 | Hnat | 65/27 |
| 4,957,527 | 9/1990 | Hnat | 65/27 |
| 4,977,837 | 12/1990 | Roos et al. | 110/346 |
| 5,018,457 | 5/1991 | Brady et al. | 110/215 |
| 5,050,511 | 9/1991 | Hallett et al. | 110/346 |
| 5,114,122 | 5/1992 | Hnat | 266/186 |
| 5,188,043 | 2/1993 | Trepaud | 110/346 |
| 5,269,235 | 12/1993 | McGill et al. | 110/215 |

*Primary Examiner*—Noah P. Kamen
*Attorney, Agent, or Firm*—Pravel, Hewitt, Kimball & Krieger

[57] ABSTRACT

A method and apparatus for gasifying organic materials in a gasification reactor and vitrifying residual ash in a melting furnace comprising introducing a charge containing organic materials into said reactor, heating the charge sufficiently to thermally decompose and gasify the organic materials resulting in evolved gases, by means of at least one high temperature burner gas stream by combustion of a fuel with an oxygen-containing gas, to produce said synthesis gas and residual ash, introducing said residual ash from said reactor into a separate melting furnace, vitrifying said residual ash in said melting furnace by combustion of a fuel with an oxygen-containing gas, removing said vitrified ash as a solid frit product, and introducing the combustion gas from said furnace into said reactor.

10 Claims, 2 Drawing Sheets

METHOD AND APPARATUS FOR GASIFYING ORGANIC MATERIALS AND VITRIFYING RESIDUAL ASH

FIELD OF THE INVENTION

The present invention relates to a method and apparatus for producing reducing gases, commonly known as synthesis gas (or syngas), and residual ash from solid organic residues. More particularly the invention relates to a method and apparatus for gasifying industrial and domestic wastes in a gasification reactor and vitrifying the residual ash from the gasification reactor in a melting furnace.

BACKGROUND OF THE INVENTION

This invention is a modification and improvement of the invention disclosed and claimed in U.S. Pat. No. 5,425,792, which issued on Jun. 20, 1995. The disclosure of U.S. Pat. No. 5,425,792 is specifically incorporated by reference in its entirety. U.S. Pat. No. 5,425,792 discloses a method and apparatus for producing syngas using an oxy-fuel burner to volatize the organic feed materials. The products associated with the gasification reactor can be generally described as syngas and residual ash.

The energy requirements of the gasification reactor are substantial, and disposal of the residual ash may pose an environmental problem. This ash product needs to be handled in an environmentally safe and economically efficient manner. Simply dumping it in a landfill may not be an environmentally viable solution, but one way to solve the problem is to vitrify the ash to form a commercial glass or frit product. However, vitrifying processes create other problems, such as high energy requirements and potentially polluting exhaust gases. Therefore, a need exists to find a way to lower the energy requirements of the gasification reactor and to find a way to safely and efficiently handle the residual ash, preferably by converting it into a commercial product.

SUMMARY OF THE INVENTION

The present invention effectively integrates two independent operations, namely, a gasification reactor and a melting furnace. As disclosed in U.S. Pat. No. 5,425,792, which is incorporated by reference, the gasification reactor is able to volatize organic feed material by injecting a fuel mixture of methane and oxygen which burns to form carbon dioxide and water vapor inside the gasification reactor. The extreme heat and absence of free oxygen causes the organic feed material to completely volatize and dissociate into a syngas, leaving only a residual ash product. The present invention uses the gasification reactor described in U.S. Pat. 5,425,792, but integrates a melting furnace into this process in such a way that lowers the energy requirements of the gasification reactor and eliminates the air pollution problems typically associated with a melting furnace. The melting furnace functions to vitrify the ash product from the gasification reactor, but the hot exhaust gas from the melting furnace replaces or supplements the energy requirements of the gasification reactor which was previously supplied by the oxy-fuel burner.

It has been discovered that the exhaust gas from a melting furnace provides essentially the same components, e.g., carbon dioxide and water vapor, as the oxy-fuel burner in the gasification reactor disclosed in U.S. Pat. No. 5,425,792. Therefore, it is possible to combine these two operations to create a more energy-efficient system whereby the residual ash is vitrified in a melting furnace and the exhaust gas from the melting furnace is injected into the gasification reactor in place of or as a supplement to the oxy-fuel burner.

Yet another benefit from the integration of these two independent processes is the elimination of the smokestack usually required in a melting furnace operation because the exhaust gas, which is generally vented to the atmosphere, is injected instead into the gasification reactor where it creates syngas from the organic feed material. The only gas exiting from the system is the syngas which can be easily filtered to remove dust particles prior to sale or use within the operation. This dust is simply combined with the residual ash to form the feed material for the melting furnace.

Briefly stated, it is an object of the present invention to vitrify the residual ash from a gasification reactor by injecting the residual ash into a high temperature melting furnace. The residual ash will be vitrified in the melting furnace to form a glass or frit that is useful in various commercial products.

It is also an object of this invention to lower the heat requirements of the gasification reactor by using the hot exhaust gas from the melting furnace in place of or as a supplement to the burner described in U.S. Pat. No. 5,425,792.

DETAILED DESCRIPTION OF THE EMBODIMENTS

U.S. Pat. No. 5,425,792 provides a disclosure of the preferred gasification reactor and that disclosure is specifically incorporated herein by reference. The melting furnace can be any of several commercially available furnaces. U.S. Pat. No. 5,114,122 to Hnat gives a disclosure of the preferred melting furnace for use in this invention. U.S. Pat. No. 4,544,394 to Hnat describes another embodiment of a melting furnace that is suitable for use in the present invention. Also, U.S. Pat. No. 4,685,404 to Sheppard et. al. describes a suitable melting furnace. Other melting furnaces, such as the AVCO toroidal vortex combustor, the TRW horizontal cyclone combustor, the PETC vertical reverse flow cyclone combustor and the GE axial swift cyclone combustor should work well in this invention. Of course, the particular melting furnace used may have to be adapted for optimum results in this process but any adaptation is well within the ability of a person of ordinary skill in the field once that person understands the objective of this invention. The only essential requirement of the melting furnace is that it provide a high temperature oxidizing gas that comprises basically carbon dioxide and water vapor, similar to the gas generated by the oxy-fuel burner disclosed in U.S. Pat. No. 5,425,792.

Figure 1:
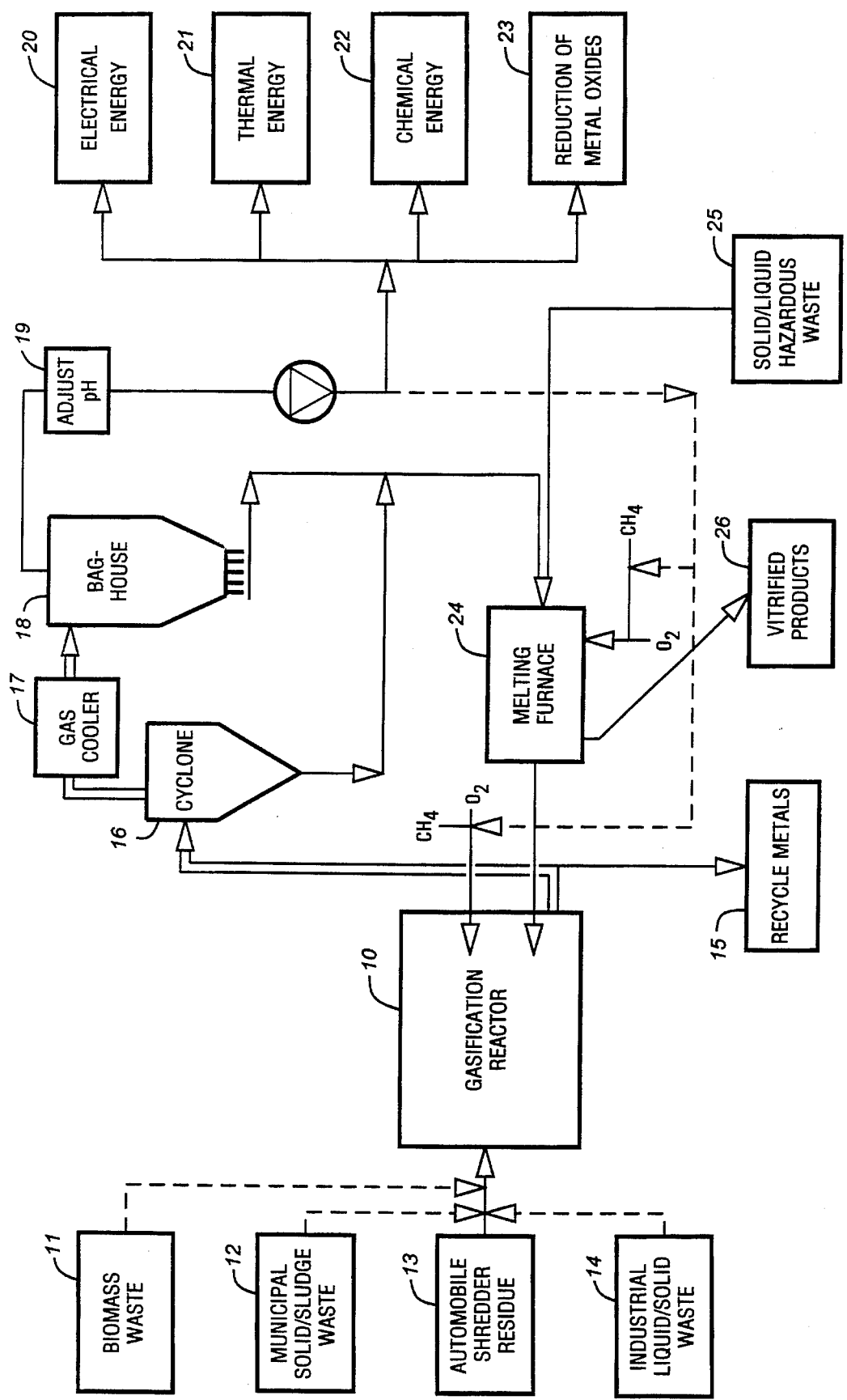
FIG. 1 shows a block diagram of a preferred embodiment of the present invention useful for gasifying organic waste to yield a synthesis gas and a vitrified product from the residual ash.

FIG. 1 is a block diagram of the preferred embodiment of this invention. At the heart of this invention is the gasification reactor 10 which has been described in detail in U.S. Pat. No. 5,425,792. Blocks 11, 12, 13 and 14 represent various organic feed materials that can be used in the gasification reactor 10. Depending on what feed materials are used, the products from the gasification reactor typically comprise syngas, residual ash and solid metals that can be easily separated from the ash, as shown in block 15.

Still referring to FIG. 1, the syngas and residual ash are initially separated in a cyclone 16. The syngas is typically transferred to a gas cooler 17, a baghouse 18 for dust filtration, and a pH adjuster 19 before it is ready for sale or use within the process. Some uses of syngas are illustrated in blocks 20, 21, 22 and 23. Of course, it is also possible to use the syngas as a fuel source in the gasification reactor 10 or the melting furnace 24.

As shown in FIG. 1, ash from cyclone 16 and dust from baghouse 18 combine to become the feed stock of the melting furnace 24. Of course, other materials, such as solid or liquid hazardous wastes shown in block 25, could also be used as a feed stock. The purpose of the melting furnace 24 is twofold. Its primary function is to simply vitrify the residual ash and dust generated by the gasification reactor. This vitrified product can be removed as a useable product, as shown in block 26. However, the melting furnace also serves the additional purpose of supplying a high temperature exhaust gas that can be injected directly into the gasification reactor to drive or at least supplement the energy requirements of the gasification reactor.

One additional benefit of integrating these heretofore completely independent processes as described above is that the need to clean the exhaust gas from the melting furnace before it is vented to the atmosphere is completely eliminated because all of the exhaust gas flows directly into the gasification reactor to create more syngas from the organic feed materials. As it so happens, integrating these two processes in the manner described herein has the synergistic effect of making both more efficient.

Figure 2:
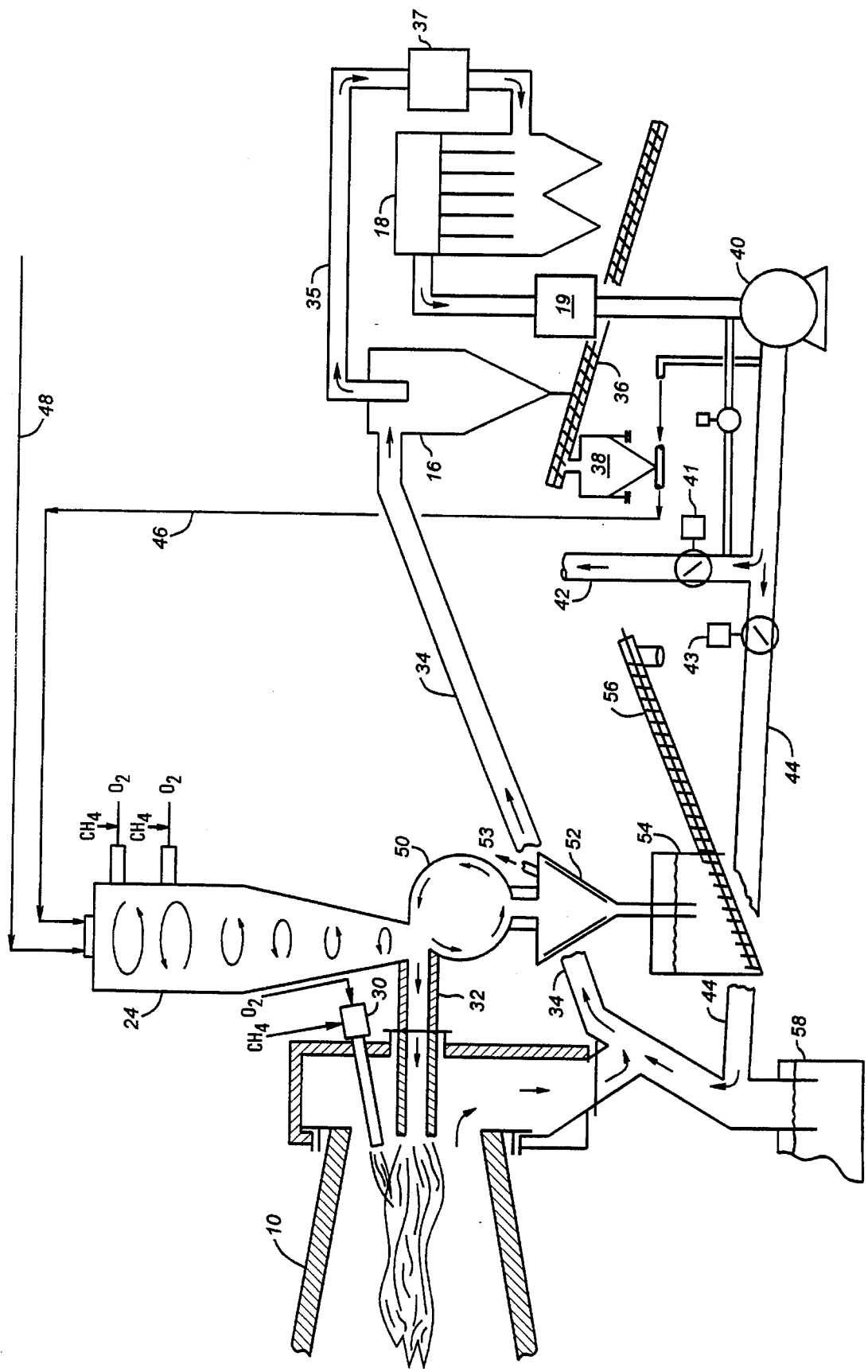
FIG. 2 shows a partially schematic diagram of a preferred embodiment of the present invention.

FIG. 2 shows the preferred embodiment of the present invention in more detail. The gasification reactor 10 has an oxy-fuel burner 30 which is described in detail in U.S. Pat. 5,425,792. However, reactor 10 also has an injector tube 32 for introduction of the exhaust gas from melting furnace 24. During startup of the process, burner 30 will be used to drive reactor 10. However, when furnace 24 is fired up, the exhaust gas will supplement burner 30. It is anticipated that burner 30 can be shut off once the process is fully operational since all the heat requirements of reactor 30 should be supplied by furnace 24. It is expected that burner 30 will be used at times during the process to help balance the heat requirements of reactor 10 and again during shutdown so that the process can be stopped safely under controlled conditions.

Hot exhaust gas from melting furnace 24 is injected into reactor 10 through injection tube 32. The rate of injection and the temperature of the exhaust gas needs to be similar to the parameters of burner 30 to ensure that the gasification process is not upset as the heat source is switched from the burner 30 to the injection tube 32. If the injection tube 32 does not provide enough heat to the gasification process, the burner 30 can be used as a means of balancing the process while it is running. Typically, the temperature of the exhaust gas entering the reactor 10 from the furnace 24 ranges from about 1350° C. to about 1450° C. and is composed of about 90% carbon dioxide 3% water vapor and 7% free oxygen.

Residual ash from reactor 10 exits the bottom and is carried by the syngas through line 34 to cyclone 16 where most of the ash is separated from the syngas. Water seal 58 is positioned at the bottom of the reactor 10 to catch any large pieces of metal, rocks, char or glass that are too heavy to be carried by the syngas through line 34. Ash from cyclone 16 falls onto conveyor 36 and is carried to bin 38.

Syngas and dust exit cyclone 16 through line 35. The hot gas enters heat exchanger 37 and baghouse 18 where the dust is separated from the syngas. The dust is also collected on conveyor 36 for transport to bin 38. Clean syngas exiting baghouse 18 is treated for acidity in acid treater 19 and is pushed by blower 40 into product line 42 or recycle line 44. Control valves 41 and 43 control the flow of gas into the respective lines.

Residual ash from bin 38 is transported through line 46 to the top of the melting furnace 24. If desired, other material, such as liquid or solid hazardous wastes, may be added through line 48 into the furnace 24. Once inside the furnace 24, the residual ash is vitrified by the burning of methane and oxygen in ratios to ensure an oxidizing exhaust gas comprising primarily carbon dioxide and water vapor, but may also have free oxygen. Of course, syngas could also be used as a fuel for furnace 24. Once the ash is vitrified into a molten slag, it exits the bottom of cyclone 24 and collects on liquid/gas phase separator 50 before draining into glass casting port 52. Steam exits port 53, and the vitrified ash flows into a water seal 54 to form the frit which is transported by extraction conveyor 56.

We claim:

1. A process for treating organic materials to produce a synthesis gas and a vitrified product from residual ash comprising the steps of:

introducing a charge containing organic materials into a gasification reactor, heating the charge in the reactor sufficiently to gasify, the organic materials to produce synthesis gas and residual ash, removing the synthesis gas and residual ash from the gasification reactor, introducing the residual ash into a separate melting furnace, heating the residual ash in the melting furnace by combustion with an oxygen-containing gas to produce a combustion gas and a vitrified product, removing the vitrified product, and introducing the combustion gas from the melting furnace into the gasification reactor.

2. The process of claim 1 further including the step of:

separating the residual ash from the synthesis gas.

3. The process of claim 1 wherein the synthesis gas comprises primarily hydrogen and carbon monoxide.

4. The process of claim 1 wherein the combustion gas comprises primarily carbon dioxide and water vapor.

5. The process of claim 1 wherein the melting furnace is a cyclone combustor.

6. An apparatus for treating organic materials to produce a vitrified product and a synthesis gas, comprising:

a gasification reactor for gasifying organic feed material to produce synthesis gas and residual ash;

a means for introducing a charge of organic materials into the gasification reactor;

a separator in fluid communication with the gasification reactor for receiving the synthesis gas and residual ash produced in the gasification reactor and separating the synthesis gas and residual ash;

a melting furnace for heating the residual ash from the separator to produce a vitrified product and a combustion gas;

a means for conveying residual ash from the separator to the melting furnace; and a means for injecting the combustion gas produced in the melting furnace into the gasification reactor.

7. The apparatus of claim 6 wherein the gasification reactor includes a gasification reactor burner for producing a high temperature gas.

8. The apparatus of claim 7, further comprising a means for conducting at least a portion of the synthesis gas from the separator to the gasification reactor burner.

9. The apparatus of claim 6, further comprising a means for conducting at least a portion of the synthesis gas from the separator to the melting furnace.

10. The apparatus of claim 6 wherein the melting furnace is a cyclone combustor.

\* \* \* \* \*